United States Patent [19]

Smith

[11] 4,354,549

[45] Oct. 19, 1982

[54] INDUCED CIRCULATION OVEN OR COOLER

[76] Inventor: Donald P. Smith, 4530 Woodfin Dr., Dallas, Tex. 75220

[21] Appl. No.: 75,803

[22] Filed: Sep. 14, 1979

[51] Int. Cl.³ .............................................. F25B 13/00
[52] U.S. Cl. .............................. 165/62; 165/DIG. 25; 126/21 A; 219/400; 34/DIG. 9; 34/34; 34/221; 34/224; 99/475; 99/477
[58] Field of Search ............... 165/DIG. 25, DIG. 26, 165/61, 62; 34/155, 156, 219, 221, 224, 232, 34, 39; 99/467, 473, 475, 483, 485, 477; 219/10.55 R, 400; 126/21 A

[56] References Cited

U.S. PATENT DOCUMENTS

| | | | |
|---|---|---|---|
| 3,261,343 | 7/1966 | Tibell | 126/21 |
| 3,682,643 | 8/1972 | Foster | 165/DIG. 25 |
| 3,884,213 | 5/1975 | Smith | 99/473 |
| 3,943,842 | 3/1976 | Bills et al. | 99/473 |
| 4,154,861 | 5/1979 | Smith | 99/475 |
| 4,203,486 | 5/1980 | Rubbright et al. | 165/DIG. 26 |

Primary Examiner—Samuel Scott
Assistant Examiner—Margaret A. Focarino
Attorney, Agent, or Firm—Gerald G. Crutsinger; John F. Booth; Monty L. Ross

[57] ABSTRACT

A food processing unit and method of processing food uses a housing which receives vertically disposed layers of food product. The temperature of the fluid within the housing is controlled to process the food product. A pressurized fluid is supplied into the housing and the fluid within the housing is then induced to circulate by directing a flow of fluid from the pressurized fluid in a substantially horizontal direction through spaces between layers of the food product. The directed fluid flow may be distributed within the housing so that heat transferred in zones from the fluid throughout the layers of food product or the directed fluid may be redirected to flow in those spaces adjacent spaces through which the fluid is initially directed so that the flow of ambient fluid within the housing is induced to circulate around each layer of food product.

30 Claims, 7 Drawing Figures

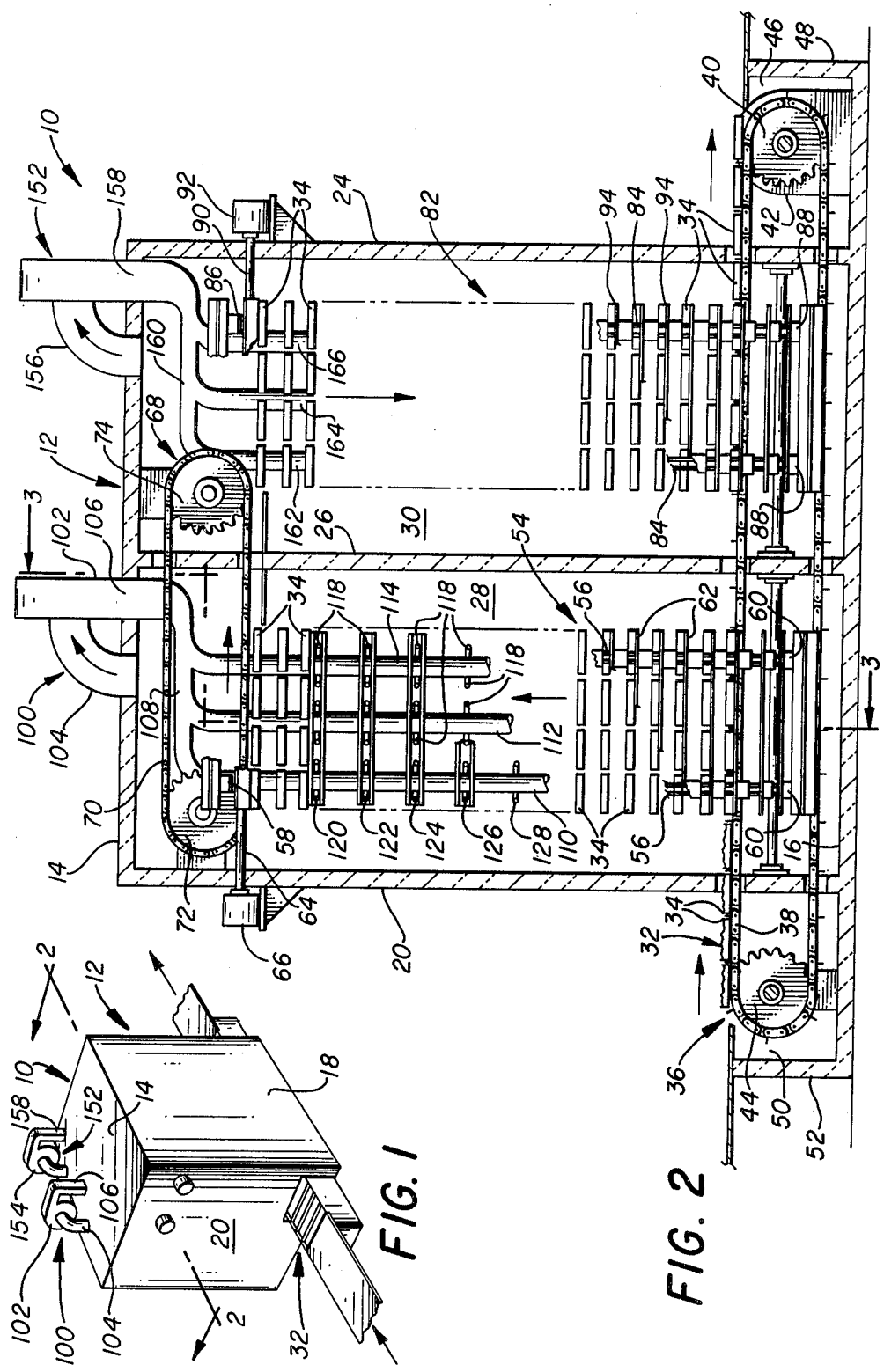

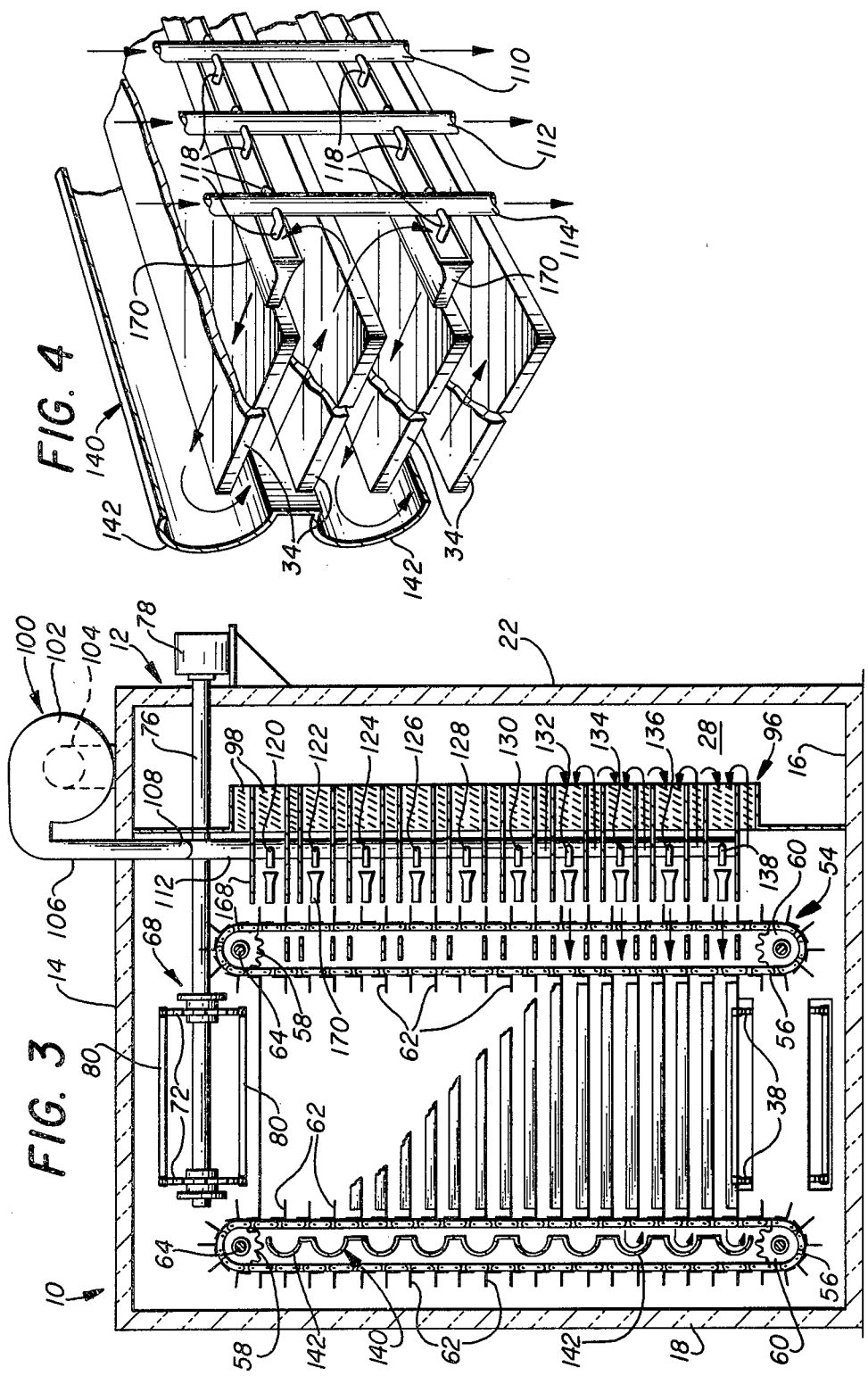

INDUCED CIRCULATION OVEN OR COOLER

BACKGROUND AND BRIEF SUMMARY OF THE INVENTION

Apparatus for and methods of processing food, such as by cooking, heating, cooling and freezing, are well known.

An example of a typical blast freezer is the "Linetray Freezer" sold by Litton Industries which has a housing, a first conveyor that carries food product horizontally into the housing, a second conveyor that carries the food product vertically upward withing the housing past a series of fans which circulates the air in the housing, and a third conveyor horizontally carries the food product across the top of the housing to a storage bin wherein the food product is stored within the housing in the frozen condition. One disadvantage of this type freezer is that the motors used are disposed in the housing which adds heat to the housing and thereby lowers the efficiency of the blast freezer. Another disadvantage is that the fans do not circulate the fluid within the housing in a fashion promoting the most useful amount of heat transfer to these remote portions of the housing which thereby lengthens the time the food product must be disposed within the housing. A further disadvantage of this type freezer is that the control of the fluid circulating within the housing is not as accurate as one would desire thereby causes certain areas of the vertically disposed food product to receive larger quantities of air than other portions of the food product which causes variations in freezing between top, bottom and middle section of the vertically disposed rack.

Another example of apparatus used to process food is the oven disclosed in U.S. Pat. No. 3,261,343 by Tibell which includes a housing adapted to receive a moveable rack which supports vertically disposed layers of food product. Side walls are provided within the housing with slots extending therethrough to direct fluid flow from one wall to the other wall between the layers of food product to thereby induce circulation of the air in the housing around each layer of food product. This apparatus also fails to properly control the flow of the fluid between each layer of food product to balance the top, middle and bottom heat transfer to the food product. Further, this apparatus does not control the flow of the fluid for redirection between alternate layers of food product to thereby induce circulation of the fluid around each layer of the food product.

Accordingly, it is an object of the present invention to provide a food processing unit and a method of processing a food product which directs the flow of fluid in a substantially horizontal direction through spaces between layers of food product and distributes the flow of the directed fluid within the housing to induce circulation of fluid throughout the housing such as to provide a balanced heat transfer from the fluid throughout the vertically disposed layers of food product.

Further, it is an object of the present invention to provide a food processing unit and a method of processing a food product which controls the circulation of the fluid throughout the housing so as to enable accurately controlled heat transfer at remote portions.

Further, it is an object of the present invention to provide a food processing unit and a method of processing a food product which controls the circulation of the fluid within a housing so as to direct a flow of fluid from a first side through those spaces located prior to every other layer of food product and then redirect the flow of fluid toward the first side in those spaces adjacent the spaces through which the fluid is initially directed to induce circulation of the fluid within the housing around each layer of food product.

Further, it is an object of the present invention to provide a processing unit which circulates the fluid within the housing so as to prevent heat from motors used with such unit to affect the efficiency of such unit.

In accordance with the present invention, a food processing unit uses a housing adapted to receive vertically disposed layers of food product. Heat transfer apparatus is provided to control the temperature of the fluid within the housing when processing the food product. Apparatus is further provided to supply the pressurized fluid within the housing and apparatus is used to direct the flow of fluid from the pressurized fluid supplying apparatus to a substantially horizontal direction through spaces between layers of food product. Apparatus is further provided which distributes the flow of directed fluid within the housing to induce circulation of the fluid within the housing such as to provide zones of controlled heat transfer from the fluid to the food product vertically throughout the housing.

Further, in accordance with the invention, a food product processing unit includes a housing used in processing vertically disposed layers of food product. Heat transfer apparatus is provided for controlling the temperature of the fluid environment within the housing when processing the food product. Apparatus is further provided for supplying a pressurized fluid in the cabinet. Apparatus is disposed on a first side of the layers of food product for directing a flow of fluid from the pressurized fluid supplying means in a substantially horizontal direction through those spaces located prior to every other layer of food product and apparatus is disposed on the side of the layers of food product opposite the first side for redirecting the directed flow of fluid toward the first side in those spaces adjacent the spaces through which the fluid is initially directed by the directing means to induce circulation of the ambient fluid within the housing around each layer of food product.

Further, in accordance with the invention, a method of processing a food product comprises the steps of positioning layers of vertically disposed food product within the housing. The temperature of the environment within the housing is controlled to process the food product. A pressurized fluid is supplied in the housing and a flow from the pressurized fluid is directed horizontally between alternate layers of the food product with the directed fluid being distributed vertically within the housing such that the heat transfer is provided in zones of controlled heat transfer from the ambient fluid within the housing to the layers of food product.

Further, in accordance with the invention, a method of processing a food product comprises the steps of positioning layers of vertically disposed food product within a housing. A pressurized fluid is supplied in the housing and a flow of fluid from the pressurized fluid supply is directed in a substantially horizontal direction through spaces just prior to every other layer of food product in the housing. The directed fluid is then redirected to flow toward the first side in those spaces adjacent the spaces through which the fluid is directed to induce the ambient fluid in the housing to circulate around each layer of food product. The temperature of the fluid within the housing is controlled to process the food product within the housing.

BRIEF DESCRIPTION OF THE DRAWINGS

Other objects and advantages of the invention will become apparent upon reading the following detailed description and upon reference to the drawings, in which like reference characters are used throughout to designate like parts:

FIG. 1 is a perspective view of a first food processing unit constructed according to the present invention;

FIG. 2 is a front elevational view, in section, taken in the direction of arrows 2—2 of the first food processing unit shown in FIG. 1;

FIG. 3 is a side elevational view, in section, taken in the direction of arrows 3—3 of the first food processing unit shown in FIG. 2;

FIG. 4 is a schematic representation of a first embodiment of a portion of the illustrated food processing units;

DETAILED DESCRIPTION OF THE INVENTION

Figure 5:
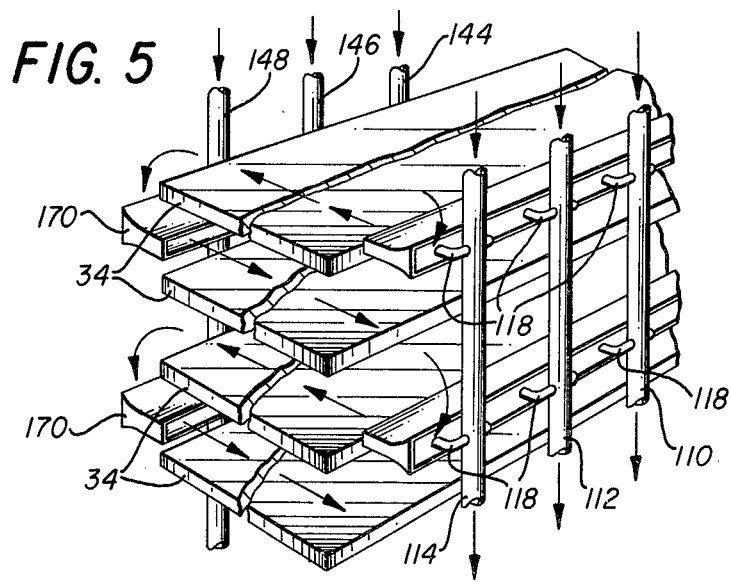
FIG. 5 is a schematic representation of a second embodiment of a portion of the illustrated food processing units.

Turning now to FIGS. 1-3, there is shown a first embodiment of a food processing unit 10 constructed according to the present invention. A housing 12 is provided for receiving vertically disposed layers of food product and includes a top 14, a bottom 16, front wall 18, left wall 20, back wall 22 and right wall 24. Also, an intermediate wall 26 extends from front wall 18 to back wall 22 intermediately of left wall 20 and right wall 24 to divide housing 12 into a first compartment 28 and a second compartment 30.

A food product 32 is mounted on trays 34 and carried by a first conveying system 36 horizontally through left wall 20 into first compartment 28 of housing 12. This conveying system is of conventional design and includes a pair of endless chains or belts 38 disposed around drive sprocket or pulley 40, powered by motor 42, and follower sprockets or pulleys 44. Sprockets or pulleys 40 are disposed within a first well 46 formed by wall 48 connected to housing bottom 16 and driven sprocket 44 is mounted within a second well 50 formed by wall 52 attached to housing bottom 16. First and second wells are provided to aid in the prevention of ice on first conveyor system 36.

A second conveying system 54 for carrying food product 32 upwardly from bottom 16 toward top 14 is disposed within first compartment 28 of housing 12. Second conveying system 54 is of conventional design which includes front and back pairs of endless chains or belts 56 disposed around drive sprockets or pulleys 58 and follower sprockets or pulleys 60. Angle iron shaped flights 62 extend transversely between each pair of endless chains 56 for engaging trays 34 carried by first conveyor system 36. Drive shafts 64 interconnects drive sprocket 58 with drive motor 66, which is disposed outside of left wall 20.

A third conveying system 68 for carrying food product 32 horizontally from first compartment 28 to second compartment 30 is disposed near top 14 of housing 12. Third conveying system 65 is of conventional design which includes a pair of endless chains 70 mounted around drive sprockets 72 and follower sprockets 74. A drive shaft 76 interconnects drive sprockets 72 with a drive motor 78, which is mounted outside of back wall 22. Flights 80 extend transversely between endless chains 70 for engaging trays 34 containing food product 32 when motor 78 is activated.

A fourth conveying system 82 for carrying trays 34 with food product 32 disposed therein vertically downward toward bottom 16 of housing 12 is mounted within second compartment 30. Fourth conveying system 82 is of conventional design which includes front and back pairs of endless chains 84 mounted on drive pulleys 86 and follower pulleys 88. Drive shafts 90 interconnect drive pulleys 86 with motor 92 for moving endless chains 84. Flights 94, such as the angle line flights shown in FIG. 3, extend between the front pair of endless chains and the back pair of endless chains for carrying each tray 34 of foog product 32 when received from third conveying system 68 vertically downward to first conveying system 36 and from there outwardly of housing 12 after the food product has been processed.

A heat transfer apparatus 96 for controlling the temperature of the environment within housing 12 is mounted within each chamber 28 and 30. Heat transfer apparatus 96 is used to heat or cool the fluid environment within its respective chamber and preferably includes fins 98 mounted with coils to cool the fluid within the respective chamber as it passes through the heat transfer apparatus.

A first pressurized fluid (preferably air) supplying apparatus 100 is mounted with housing 12 to cause circulation of the environmental fluid within first compartment 28. Apparatus 100 includes a blower or fan 102 mounted exteriorly on roof 14 with its inlet mounted through conduit 104 in fluid communication with first compartment 28 of housing 12 and with its outlet mounted in fluid communication through conduit 106 with a plenum 108 which is disposed in first compartment 28 of housing 12. A first duct 110, a second duct 112 and a third duct 114 extend downwardly from plenum 108 toward bottom 16 along a first side of the layers of food product between second conveying system 54 and heat transfer apparatus 96.

A fluid flow directing apparatus 116 is provided along ducts 110, 112 and 114 for directing fluid flow from said ducts in a substantially horizontal direction through spaces between layers of food product. Preferably, this is accomplished by nozzles 118 formed in the ends of tubes mounted on either side of ducts 110, 112 and 114, which forms vertically disposed rows 120, 122, 124, 126, 128, 130, 132, 134, 136 and 138. It is preferred that the rows are displaced from one another by a distance of two layers of food product and that nozzles 118 are selected so that the same size outlet opening, even though the outlet opening in the nozzles in any one row are not the same size as the openings in the other rows. By such selection, the flow of the fluid is controlled in a manner which provides zones of heat transfer to the food products within housing 12. Moreover, nozzles 18 are spaced from one another by a distance sufficient to provide directed flow of fluid substantially evenly across each row of the nozzles to provide a substantially uniform flow of fluid across each row.

Flow redirecting apparatus 140 for redirecting the flow of fluid back to the first side is disposed on the side of the layers of product opposite the first side. As shown in FIGS. 3 and 4, this flow redirecting apparatus may use a plurality of curved baffles 142 disposed vertically above one another in first compartment 28 of housing 12. As represented by the arrows in FIG. 4, each curved baffle 142 receives the fluid flow directed over the top of a layer of food product into its upper end and redirects the flow out the lower end beneath the layer of food product to induce circulation of the fluid within first compartment 28 of housing 12 around each layer of food product.

If desired, however, flow redirecting apparatus 140 may use a system similar to fluid flow directing apparatus 116 when incomplete circulation exists or when additional cooling or heating is necessary. This structure may take the form of that schematically represented in FIG. 5, which includes a first duct 144, a second duct 146 and a third duct 148 with nozzles 150 provided thereon similar to nozzles 118 provided on ducts 110, 112 and 114. This second embodiment is especially useful when trays 34 are quite wide. The embodiment illustrated in FIG. 5 is used to redirect the flow of fluid when more heating or cooling of the food product is required than available from the flow redirecting apparatus shown in FIG. 4.

A second pressurized fluid (preferably air) supplying apparatus 152 is mounted outside of housing 12 on top 14 and includes a blower 154 having an inlet in fluid communication through conduit 156 with the interior of second compartment 30 of housing 12 and and outlet in fluid communication through conduit 158 with the plenum 160 to provide the pressurized fluid within second compartment 30 of housing 12. A first duct 162, a second duct 164 and a third duct 166 extend downwardly from plenum 160 toward bottom 16 of housing 12 along a first side of the food product between fourth conveying system 82 and heat transfer means disposed within second compartment 30. Nozzles similar to nozzles 118 are disposed upon ducts 162, 164 and 166, and are arranged in rows similarly to rows 120-138 for directing the fluid flow from plenum 160 in a substantially horizontal direction through the space between the layers of food product, and are selected for distributing the flow of the directed fluid within the housing to induce circulation of the fluid such as to provide zones of controlled heat transfer from the fluid throughout the vertically disposed layers of food product. Also, flow redirecting apparatus, as directed and shown in FIGS. 4 and 5, is mounted in second compartment 30 for redirecting the fluid in the housing to flow toward the flow directing side in those spaces adjacent the spaces through which the fluid is directed by the directing means to induce circulation of the fluid within the housing around each layer of food product.

To further induce flow of fluid through heat transfer apparatus 96, horizontal baffles 168 are mounted to extend between ducts 110, 112 and 114 or ducts 162, 164 and 166 at elevations approximately equal to each layer of food product. The redirected fluid flow is thus channelled through heat transfer apparatus 96 before recirculation by the pressurized fluid emitted through nozzles 118.

Further, an augmenting apparatus 170 having a body forming flared channels may be mounted along each row of and in close proximity to the nozzles. Augmenter 170 is formed and positioned to coact with the nozzles and create a suction similar to that provided by a jet pump as the pressurized fluid is emitted from the nozzles which induces fluid flow through heat transfer apparatus 96 prior to the fluid passing around the layers of food product.

In operation, food product 32 is mounted on tray 34 and deposited on first conveyor means 36 and carried into first compartment 28 of housing 12. Second conveying system 54 then intermittently carries the trays of food product 32 in a step-wise fashion upwardly toward top 14 of housing 12 for processing. Blower 102 supplies pressurized fluid to plenum 108 and ducts 110, 112 and 114. This pressurized fluid is then directed horizontally by nozzles 118 which causes the fluid in compartment 28 to circulate across and around each layer of food product with a balanced heat transfer. When each layer of food product reaches third conveying system 68, food product 32 is moved from first compartment 28 into second compartment 30 and deposited onto fourth conveying system 82 for intermittent movement downwardly in a step-wise fashion toward bottom 16. Blower 154 supplies pressurized fluid to plenum 160 and ducts 162, 164 and 166. This pressurized fluid is then directed horizontally by the rows of nozzles in the appropriate spaces to induce the fluid in compartment 30 to circulate the layers of food product. Upon arrival of food product 32 at first conveyor system 36, the food product is moved outwardly of housing 12 for storage.

Figure 6:
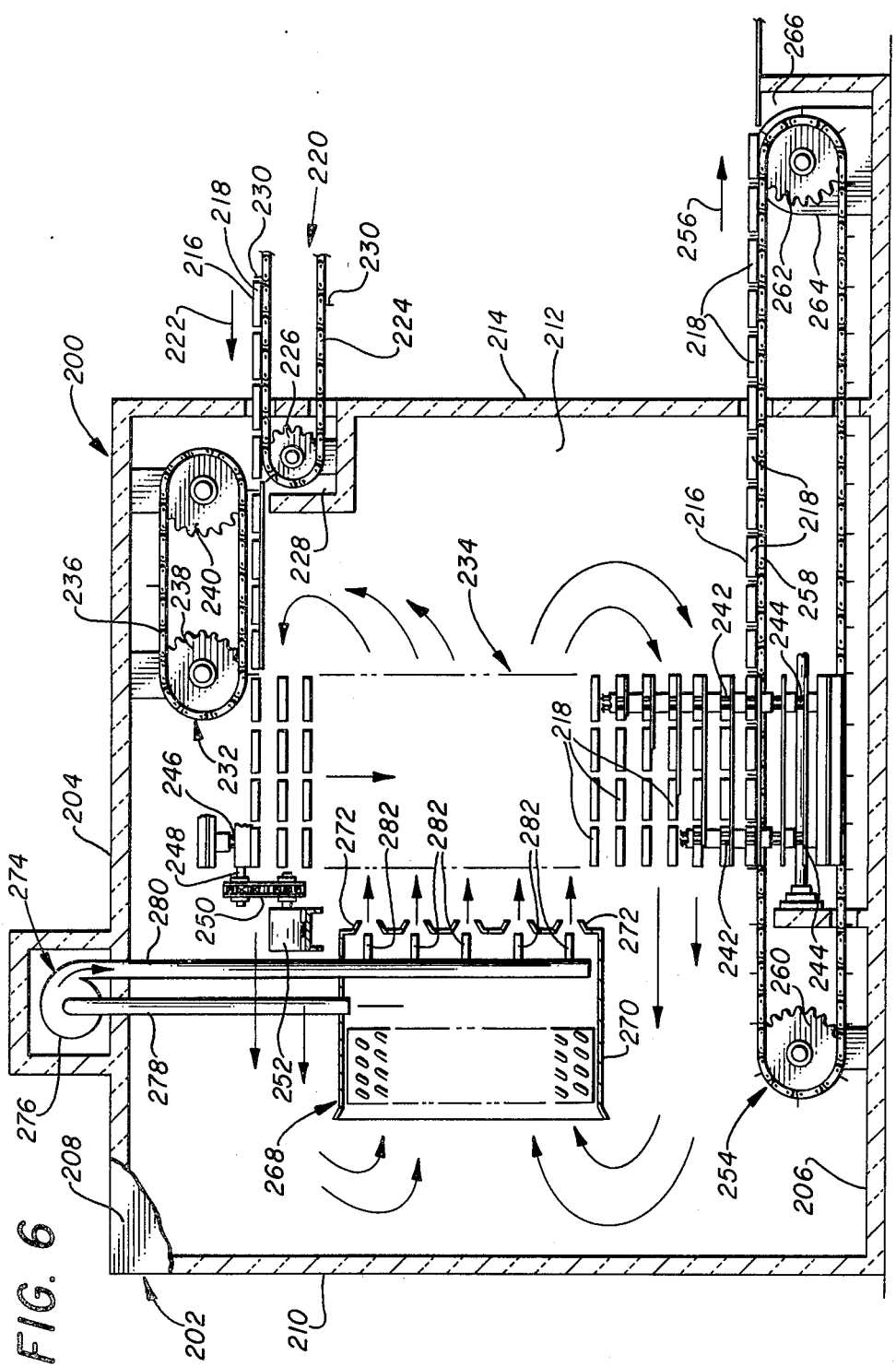
FIG. 6 is a front elevational view, in section, of a second food processing unit constructed according to the present invention.

Turning now to FIG. 6, there is shown a second embodiment 200 of a food processing unit constructed according to the present invention. This second embodiment includes a housing 202 which has a top 204, a bottom 206, a front wall 208, a left wall 210, a back wall 212, and a right wall 214 to enclose a fluid environment wherein a food product 216 supported by trays 218 is processed.

A first conveying system 220 is disposed to carry food product 216 horizontally through right wall 214 into housing 202 as represented by arrow 222. First conveying system 220 is of conventional design which includes a pair of endless chains 224 with the chains mounted on drive pulleys (not shown) and follower pulleys 226 which are pivotally mounted within a well 228 disposed within housing 202. Well 228 is provided within the housing to aid in preventing the formation of ice upon endless chains 224. Flights 230 extend transversely between the pairs of endless chains 224 for engaging trays 228 to move food product 216 into housing 202.

A second conveying system 232 is disposed within housing 202 for moving food product 216 horizontally into position on a third conveying system 234, which moves the food product vertically downward toward bottom 206. Second conveying system 232 is of conventional design which includes a pair of endless chains 236 mounted with pulleys 238 and 240. Third conveying system 234 is of similar design to the fourth conveying system 82 previously described and includes front and back pairs of endless chains 242 mounted with follower sprockets 244 and drive sprockets 246. A drive shaft 248 interconnects drive sprockets 246 through a chain drive 250 with a drive motor 252.

A fourth conveying system 254 is mounted with housing 202 to horizontally carry food product 216, as represented by arrow 256, outwardly of housing 202 after food product 216 has been processed. Fourth conveying system 254 is of conventional design which includes a pair of front and back endless chains 258 with each endless chain being mounted to a follower pulley 260 pivotally mounted within housing 202 and a drive pulley 262 mounted outside of housing 202 on a motor 264. Drive pulley 262 is disposed within a well 266 to aid in preventing ice on fourth conveying system 254.

A heat transfer apparatus 268 is disposed within housing 202 for controlling the temperature of the fluid environment within the housing when processing food product 216. Heat transfer apparatus 268 is mounted in the left-hand side of a casing 270 and disposed along the right-hand side of casing 270 are flared channels 272 which acts similarly as augmenter 170, previously described.

A pressurized fluid supplying apparatus 274 is mounted with housing 202 and includes a blower or fan 276 mounted with a duct 278 which places the inlet of blower 276 in fluid communication with the interior of casing 270 and with a duct 280 which places the outlet of blower 276 in fluid communication with casing 270. To direct the pressurized fluid from blower 276 in a substantially horizontal direction through spaces between layers of food product 216, nozzles 282 are disposed in rows at different elevations within casing 270 and in alignment with flared channels 272. The rows of nozzles 282 at each elevation are selected to distribute the flow of directed fluid such as to provide zones of controlled heat transfer from the ambient fluid within housing 202 throughout the vertically disposed layers of food product.

To operate second food processing unit 200, food product 216 is disposed in trays 218 on first horizontal conveying system 220. The food product then is horizontally moved into housing 202 by conveying system 220 and by intermediate conveyor 232 to the third conveying system 234. Food product 216 is then intermittently moved by third conveying system 234 step-wise downward toward bottom 206 past nozzles 282 which induces circulation of the fluid in housing 202 around the food product as the product is being processed by the heat or cold supplied by heat transfer means 268. When each food product 216 arrives at fourth conveying system 254 such food product is removed from housing 202 for appropriate handling.

Figure 7:
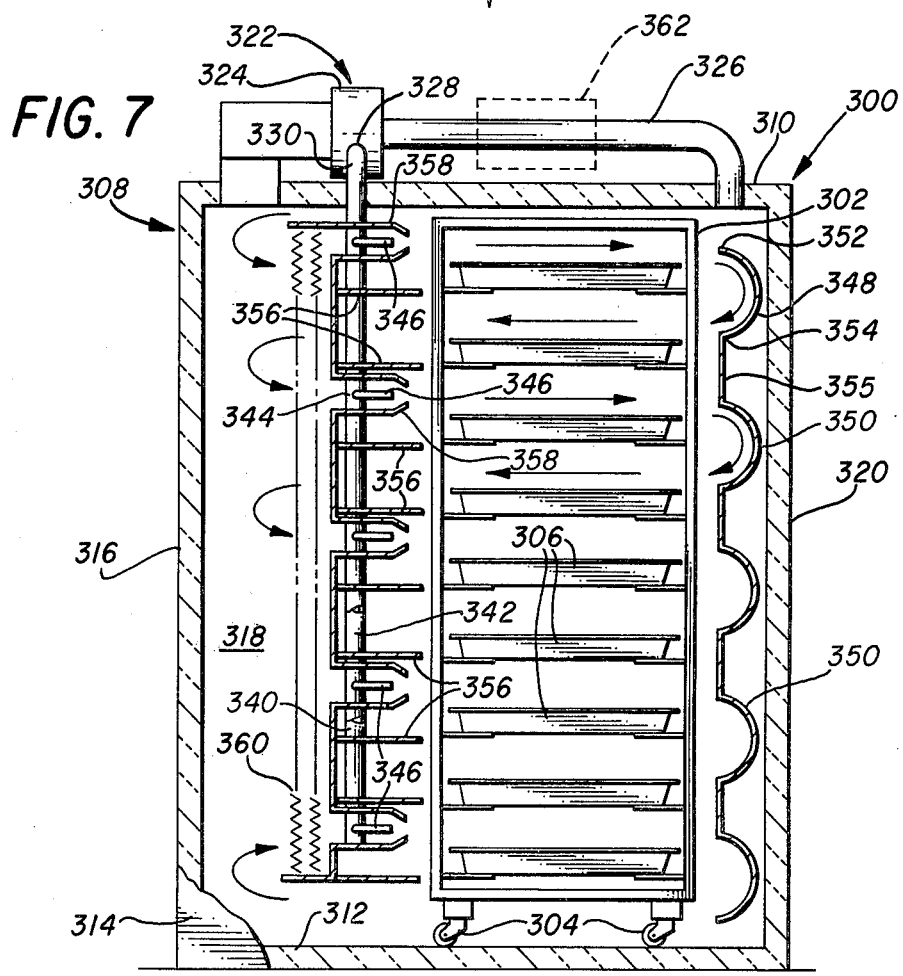
FIG. 7 is a front elevational view, in section, of a third food processing unit constructed according to the present invention.

Turning now to FIG. 7, there is shown a third processing unit 300 which is adapted to receive a rack 302 moveably supported by rollers 304 with food product provided in the vertically disposed trays 306. Third food processing unit 300 includes a housing 308 which has a top 310, a bottom 312, a front side 314, a left side 316, a back side 318 and a right side 320. An opening covered by a door (not shown) is provided through front 314 through which rack 302 is rolled into position for processing the food product.

A pressurized fluid supplying apparatus 322 is mounted on top 310 of housing 308 and includes a blower 324 mounted to a duct 326, which places the inlet of blower 324 in fluid communication with the top right-hand corner of housing 308, and mounted to a duct 328, which places the outlet of blower 324 in fluid communication with a plenum 330. Extending vertically downwardly into housing 308 from plenum 330 are a first vertically disposed duct 340, a second vertically disposed duct 342, and a third vertically disposed duct 344.

To direct flow from the vertically disposed ducts in a substantially horizontal direction through spaces between the layers of food product formed by trays 306, a nozzle 346 is mounted on each side of vertically disposed ducts 340, 342 and 344 to form rows of such nozzles. The nozzles of each row are selected in size and number so that the flow of directed fluid is distributed to induce circulation within the housing in a manner such as to provide zones of controlled heat transfer throughout the vertically disposed layers of food product.

A flow redirecting apparatus 348 is mounted on the side of rack 302 opposite from fluid circulation inducing apparatus 322. Preferably, flow inducing apparatus 348 takes the form of curved baffles 350 which have a first end 352 receiving the flow over a tray and a second end 354 redirecting the fluid in the space between two trays 308 to thereby induce the flow of fluid around each layer of food product. Curved baffles 350 are connected to one another by use of plates 356 to further aid in redirecting the fluid flow within housing 308.

A horizontal plate 356 is mounted on ducts 340, 342, and 344 to extend from front 314 to back 318 at an elevation equal to the bottom of each tray 306 to aid in channelling the flow of fluid through a heat transfer apparatus.

Flared augmenters 358 are disposed along each row of nozzles 346 to create a jet pump effect as the pressurized fluid is directed horizontally across each layer of food product which creates a suction to draw environmental gas within housing 308 through the heat transfer apparatus which further induces circulation around the food product.

A heat transfer apparatus is provided for controlling the temperature of the fluid environment within housing 308. The heat transfer means may take the form of a heat exchanger 360 vertically disposed within housing 308 or a heat exchanger 362 mounted exteriorly of housing 308 on conduit 326 or on conduit 328 for heating the fluid being circulated by pressurized fluid supplying apparatus 322.

To operate third processing unit 300, the food product is mounted on trays 306 and trays 306 mounted onto rack 302. The door to housing 308 is opened and rack 302 is rolled into position. The switch is thrown to activate the food processing unit and either heat is added or removed from the fluid environment within housing 308 while blower 324 supplies pressurized fluid through nozzles 346 to the layers of vertically disposed food product. After the food product has been processed, the blower may be inactivated and the food product stored within housing 308 or the food product may be removed from housing 308 and a new process started. Further, if desired, rack 302 with food product disposed on trays 306 may be rolled into housing 308 cooled by the above procedure, stored for a period of time and then cooked by reversing the heat transfer apparatus at which time the food product would be removed from the housing.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without department from the scope thereof, it is to be understood that all matter herein set forth or shown in the accompanying drawings is to be interpreted as illustrative and not in a limiting sense.

The invention having been described, what is claimed is:

1. A food processing unit, comprising: a housing adapted to receive vertically disposed layers of food product; heat transfer means for controlling the temperature within said housing when processing the food product; means for supplying a pressurized fluid in said housing; directing means for directing a flow of fluid from said pressurized fluid supplying means in a substantially horizontal direction through the space vertically located between the layers of food product, said directing means including a plurality of nozzles disposed in rows along a side of the layers of food product, the nozzles being disposed to direct the fluid in the horizontal direction, the rows being displaced from one another by a distance of two layers of food product, and the nozzles of each row having approximately the same size outlet opening; and means for distributing the flow of directed fluid to induce circulation of the fluid within the housing such as to provide zones of controlled heat transfer to the vertically disposed layers of food product throughout said housing.

2. A food processing unit as set forth in claim 1, wherein said housing includes a top, a bottom and side walls with an opening extending through one of the walls, said opening being of sufficient size to receive a rack which supports the vertically disposed layers of food product.

3. A food processing unit as set forth in claim 1, including: a conveying system for carrying the food product vertically in said housing; and means for intermittently moving said conveying system so that the spaces between the food product are positioned opposite said directing means when the said conveying system stops moving.

4. A food processing unit as set forth in claim 1, including: a first conveying system for carrying the food product horizontally into the housing; a second conveying system for carrying the food product vertically in said housing; and means for intermittently moving said second conveying system so that the spaces between the food product are positioned opposite said directing means when said second conveying system stops moving.

5. A food processing unit as set forth in claim 4, including: a third conveying system disposed in said housing for transporting the food product horizontally from the second conveying system to a fourth conveying system, the fourth conveying system disposed in said housing carrying the food product vertically downward from said third conveying system to the first conveying system which carries the food product out of said housing.

6. A food processing unit as set forth in claim 4, including: a conveying system for carrying the food product horizontally from said second conveying system outwardly of said housing.

7. A food processing unit as set forth in claim 1, including: means coacting with said nozzles for creating a suction to induce circulation of the fluid within said housing.

8. A food processing unit as set forth in claim 7, wherein said heat transfer means are disposed in said housing near said fluid directing means on the side away from the vertically disposed layers of food product; and including a series of baffles disposed opposite each layer of food product to channel the fluid circulating within said housing through said heat transfer means prior to being induced to pass between the layers of food product.

9. A food processing unit as set forth in claim 1, including: means disposed on a side of the layers of food product opposite the nozzle side for inducing the fluid in said housing to flow toward the nozzle side in those spaces adjacent the spaces through which the fluid is directed by said directing means to provide circulation of the fluid in said cabinet around each layer of food product.

10. A food product processing unit as set forth in claim 9, wherein said fluid flow inducing means includes means for directing a flow of fluid from a pressurized fluid supplying means in a substantially horizontal direction through those spaces adjacent the spaces through which the fluid is directed by the first detecting means.

11. A food processing unit as set forth in claim 9, wherein said fluid flow inducing means includes curved reflectors which receives the flow of fluid from said fluid flow directing means at one end, changes the direction of flow of the received fluid, and directs the received fluid out of the other end.

12. A food processing unit as set forth in claim 1, wherein said fluid supplying means includes means to withdraw a portion of the fluid from said housing to be used as the pressurized fluid in said food processing unit.

13. A food processing unit as set forth in claim 1, wherein said heat transfer means includes means for heating the food product disposed in said housing.

14. A food processing unit as set forth in claim 1, wherein said heat transfer means includes means for cooling the food product disposed in said housing.

15. A food processing unit as set forth in claim 1, whrein said heat transfer means includes a reversible heating and cooling device for heating or cooling the food product disposed within said housing.

16. A food product processing unit, comprising: a housing used in processing vertically disposed layers of food product; heat transfer means for controlling the temperature within said housing when processing the food product; means for supplying a pressurized fluid in said cabinet; means disposed on a first side of the layers of food product for directing a flow of fluid from said pressurized fluid supplying means in a substantially horizontal direction through those spaces located prior to every other layer of food product; and means disposed on a side of the layers of food products opposite the first side for redirecting the fluid flow from the first side toward the first side in those spaces adjacent the spaces through which the fluid is directed by said directing means to induce circulation of the ambient fluid within said housing around each layer of said food product.

17. A food processing unit as set forth in claim 16, wherein said housing includes a top, a bottom and walls with an opening extending through one of the walls, said opening being of sufficient size to receive a moveable rack which supports the vertically disposed layers of food product.

18. A food processing unit as set forth in claim 16, including: a conveying system for carrying the food product vertically in said housing; and means for intermittently moving said conveying system so that the spaces between the food product are positioned opposite said directing means when said conveying system stops moving.

19. A food processing unit as set forth in claim 16, including: a first conveying system for carrying the food product horizontally into the housing; a second conveying system for carrying the food product vertically in said housing; and means for intermittently moving the second conveying system so that the vertical spaces between the food product are positioned opposite said directing means when said second conveying system stops moving.

20. A food processing unit as set forth in claim 19, including: a third conveying system for transporting the food product horizontally from the second conveying system to a fourth conveying system, the fourth conveying system disposed in said housing for carrying the food product vertically downward from said third conveying system to the first conveying system which carries the food product out of said housing.

21. A food processing unit as set forth in claim 19, including: conveying system for carrying the food product horizontally from said second conveying system outwardly of said housing.

22. A food processing unit as set forth in claim 16, wherein said directing means includes a plurality of nozzles disposed in rows along a side of the layers of food product, the nozzles being disposed to direct the fluid in the horizontal direction, and the rows being displaced from one another by a distance of two layers of food product.

23. A food processing unit as set forth in claim 22, including: means coacting with said nozzles for creating a suction to induce circulation of the fluid within said housing.

24. A food processing unit as set forth in claim 23, wherein said heat transfer means are disposed in said housing near said fluid directing means on the side away from the vertically disposed layers of food product; and including a series of baffles disposed opposite each layer of food product to channel the fluid circulating within said housing through said heat transfer means prior to being induced to pass between the layers of food product.

25. A food product processing unit as set forth in claim 16, wherein said fluid flow inducing means includes means for directing a flow of fluid from a pressurized fluid supplying means in a substantially horizontal direction through those spaces adjacent the spaces through which the fluid is directed by the first directing means.

26. A food processing unit as set forth in claim 16, wherein said fluid flow inducing means includes curved reflectors which receives the flow of fluid from said fluid flow directing means at one end, changes the direction of flow of the received fluid, and directs the received fluid out of the other end.

27. A food processing unit as set forth in claim 16, wherein said fluid supplying means includes means to withdraw a portion of the fluid from said housing to be used as the pressurized fluid in said food processing unit.

28. A food processing unit as set forth in claim 16, wherein said heat transfer means includes means for heating the food product disposed in said housing.

29. A food processing unit as set forth in claim 16, wherein said heat transfer means includes means for cooling the food product disposed in said housing.

30. A food processing unit as set forth in claim 16, wherein said heat transfer means includes a reversible heating and cooling device for heating or cooling the food product disposed within said housing.

* * * * *